US011569495B2

United States Patent
Shin et al.

(10) Patent No.: US 11,569,495 B2
(45) Date of Patent: Jan. 31, 2023

(54) NEGATIVE ELECTRODE ACTIVE MATERIAL FOR LITHIUM SECONDARY BATTERY, NEGATIVE ELECTRODE INCLUDING THE SAME, AND LITHIUM ION SECONDARY BATTERY INCLUDING THE NEGATIVE ELECTRODE

(71) Applicant: LG CHEM, LTD., Seoul (KR)

(72) Inventors: Sun-Young Shin, Daejeon (KR); Je-Young Kim, Daejeon (KR); Yong-Ju Lee, Daejeon (KR); Jung-Hyun Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 262 days.

(21) Appl. No.: 16/626,462

(22) PCT Filed: Jan. 30, 2019

(86) PCT No.: PCT/KR2019/001308
§ 371 (c)(1),
(2) Date: Dec. 24, 2019

(87) PCT Pub. No.: WO2019/151778
PCT Pub. Date: Aug. 8, 2019

(65) Prior Publication Data
US 2020/0227731 A1    Jul. 16, 2020

(30) Foreign Application Priority Data

Jan. 30, 2018   (KR) .................. 10-2018-0011650

(51) Int. Cl.
*H01M 4/587*    (2010.01)
*H01M 4/485*    (2010.01)
(Continued)

(52) U.S. Cl.
CPC ........... *H01M 4/364* (2013.01); *H01M 4/366* (2013.01); *H01M 4/485* (2013.01); *H01M 4/587* (2013.01);
(Continued)

(58) Field of Classification Search
None
See application file for complete search history.

(56) References Cited

U.S. PATENT DOCUMENTS

| 6,300,013 B1 | 10/2001 | Yamada et al. |
| 2009/0010831 A1 | 1/2009 | Jeong et al. |

(Continued)

FOREIGN PATENT DOCUMENTS

| CN | 102893430 A | 1/2013 |
| CN | 105637692 A | 6/2016 |

(Continued)

OTHER PUBLICATIONS

International Search Report issued in corresponding International Patent Application No. PCT/KR2019/001308, dated May 16, 2019.

(Continued)

*Primary Examiner* — Zhongqing Wei
(74) *Attorney, Agent, or Firm* — Morgan, Lewis & Bockius LLP

(57) ABSTRACT

The present disclosure relates to a negative electrode material that may be used as a negative electrode active material. The negative electrode material includes a silicon oxide material containing a metal (M)-silicate and a carbonaceous material. According to an embodiment of the present disclosure, the negative electrode material may include the silicon oxide material containing a metal (M)-silicate and the carbonaceous material mixed with each other at a predetermined ratio. The negative electrode active material according to the present disclosure comprises a composite of a carbonaceous material having a broad particle size distribution with a metal-silicate, and thus provides improved electrical conductivity and life characteristics.

19 Claims, 1 Drawing Sheet

(51) Int. Cl.
  *H01M 10/0525*   (2010.01)
  *H01M 4/36*   (2006.01)
  *H01M 4/62*   (2006.01)
  *H01M 4/02*   (2006.01)

(52) U.S. Cl.
  CPC ....... *H01M 4/625* (2013.01); *H01M 10/0525* (2013.01); *H01M 2004/021* (2013.01); *H01M 2004/027* (2013.01)

(56) References Cited

U.S. PATENT DOCUMENTS

| | | | |
|---|---|---|---|
| 2013/0136988 A1 | 5/2013 | Tanaka et al. | |
| 2015/0194669 A1 | 7/2015 | Inoue et al. | |
| 2016/0293944 A1 | 10/2016 | Yoon et al. | |
| 2016/0372753 A1 | 12/2016 | Fukasawa et al. | |
| 2017/0271651 A1* | 9/2017 | Behan | H01M 4/36 |
| 2018/0090750 A1 | 3/2018 | Oh et al. | |
| 2018/0151874 A1 | 5/2018 | Kim et al. | |
| 2018/0166685 A1 | 6/2018 | Choi et al. | |
| 2021/0313557 A1* | 10/2021 | Kim | H01M 4/583 |

FOREIGN PATENT DOCUMENTS

| | | | | |
|---|---|---|---|---|
| CN | 107636867 A | 1/2018 | | |
| JP | 2000-357515 A | 12/2000 | | |
| JP | 2003-192327 A | 7/2003 | | |
| JP | 2010-170943 A | 8/2010 | | |
| JP | 2013-197082 A | 9/2013 | | |
| JP | 2015-046221 A | 3/2015 | | |
| JP | 2017-147058 A | 8/2017 | | |
| KR | 10-2005-0087148 A | 8/2005 | | |
| KR | 10-2014-0132791 A | 11/2014 | | |
| KR | 20140132791 A | * | 11/2014 | |
| KR | 10-2015-0035580 A | 4/2015 | | |
| KR | 10-1586816 B1 | 1/2016 | | |
| KR | 10-2017-0048210 A | 5/2017 | | |
| WO | 2015/145521 A1 | 10/2015 | | |
| WO | 2016/085953 A1 | 6/2016 | | |
| WO | 2016/159663 A1 | 10/2016 | | |
| WO | WO-2017052278 A1 * | 3/2017 | | H01M 4/366 |

OTHER PUBLICATIONS

Office Action issued in corresponding Korean Patent Application No. 10-2018-0011650, dated Nov. 13, 2020.

Extended European Search Report issued from the European Patent Office dated Dec. 8, 2020 in corresponding European patent application No. 19748452.0.

* cited by examiner

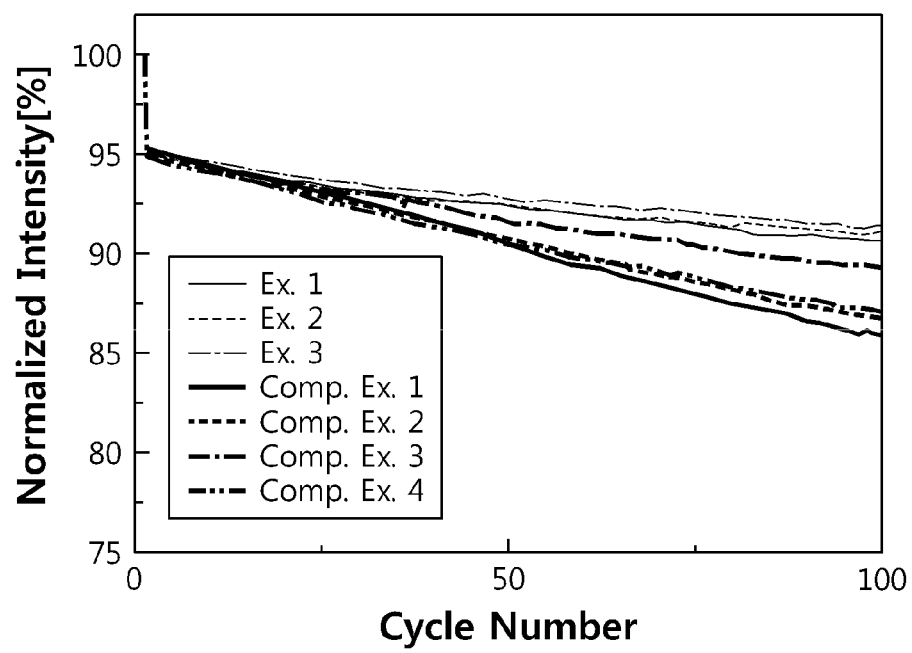

NEGATIVE ELECTRODE ACTIVE MATERIAL FOR LITHIUM SECONDARY BATTERY, NEGATIVE ELECTRODE INCLUDING THE SAME, AND LITHIUM ION SECONDARY BATTERY INCLUDING THE NEGATIVE ELECTRODE

TECHNICAL FIELD

The present disclosure relates to a negative electrode active material for a lithium secondary battery, a negative electrode including the same, and a lithium ion secondary battery including the negative electrode. The present application claims priority to Korean Patent Application No. 10-2018-0011650 filed on Jan. 30, 2018 in the Republic of Korea.

BACKGROUND ART

Recently, as mobile instruments, personal computers, electric motors and contemporary capacitor devices have been developed and popularized, high-capacity energy sources have been in increasingly in demand. A typical example of such energy sources includes a lithium secondary battery. Silicon has been given much attention as a negative electrode material for a next-generation type non-aqueous electrolyte secondary battery, since it has a capacity (about 4200 mAh/g) corresponding to about 10 times or more of the capacity (theoretical capacity: 372 mAh/g) of a graphite-based material used conventionally as a negative electrode material. Thus, silicon which is alloyed with lithium and shows high theoretical capacity has been suggested as a novel negative electrode active material substituting for a carbonaceous material. However, silicon undergoes volumetric swelling during charge and volumetric shrinking during discharge. For this, when a secondary battery is charged/discharged repeatedly, silicon used as a negative electrode active material is micronized and shows an increase in isolated particles that lose a conductive path in the electrode, resulting in degradation of the capacity of a secondary battery. As methods for improving cycle characteristics, 1) micronization of silicon, 2) use of silicon oxide ($SiO_x$), 3) use of silicon alloys, or the like, have been studied and suggested.

1) In the case of micronization of silicon, it can be expected that cycle characteristics may be improved as micronization proceeds. However, there is a limitation in reducing the crystallite size of crystalline silicon. Thus, it is difficult to solve the problem of micronization of silicon during charge/discharge.

2) When using silicon oxide ($SiO_x$), it is possible to inhibit micronization by forming micro-crystals of silicon in amorphous $SiO_y$. However, since oxide consumes Li, the initial charge/discharge efficiency is low so that use of silicon oxide is not suitable for providing a secondary battery with high energy.

3) Silicon alloys allow various material designs through variation in metal elements combined with silicon. Therefore, it is easy to form a nano-structure improving cycle characteristics and it is possible to inhibit growth of silicon crystallite. In addition, charge/discharge efficiency higher than the efficiency obtained through the use of oxide can be expected. Even in the case of the structure as suggested according to the related art, silicon crystallites having such a size (about 5 nm or more) that it can be determined by X-ray diffractometry may be inhibited from micronization. Thus, it is possible to avoid degradation of capacity slightly after charge/discharge. However, in this case, the swelling ratio is still high. When applying silicon alloys actually to a secondary battery, it is not possible to overcome the causes of a change (particularly, an increase) in thickness of a secondary battery.

Under these circumstances, there has been a continuous need for studying a novel negative electrode active material.

DISCLOSURE

Technical Problem

The present disclosure is directed to providing a negative electrode active material having excellent electrical conductivity and life characteristics, a negative electrode including the same, and a secondary battery including the negative electrode. These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a negative electrode material used as a negative electrode active material for an electrochemical device. According to the first embodiment of the present disclosure, there is a negative electrode material which includes the first active material particles and the second active material particles, wherein the first active material particles include a silicon oxide material (M-$SiO_x$ (0<x≤2)) including a metal (M)-silicate and silicon oxide, and the second active material particles include a carbonaceous material; the negative electrode material satisfies the following Formula 1, when the particle diameter ($D_{50}$) of the first active material particles is r and the particle diameter ($D_{50}$) of the second active material particles is R; and the second active material particles have a full width at half maximum (FWHM) value of 9 μm or more, as determined by plotting the central value from experiment obtained by Gaussian fitting of particle size distribution of the second active material particles and FWMH distribution:

$$1\ \mu m \leq r \leq 0.4R \quad \text{[Formula 1]}$$

According to the second embodiment of the present disclosure, there is provided the negative electrode material as defined in the first embodiment, wherein the metal (M) is lithium (Li), magnesium (Mg), calcium (Ca) or at least two of them, and the silicon oxide material may be represented by M-$SiO_x$ (wherein 0<x≤2).

According to the third embodiment of the present disclosure, there is provided the negative electrode material as defined in the first or the second embodiment, wherein the metal (M) is magnesium (Mg).

According to the fourth embodiment of the present disclosure, there is provided the negative electrode material as defined in any one of the first to the third embodiments, wherein the metal (M)-silicate is Mg-silicate, and Mg-silicate includes $MgSiO_3$, $Mg_2SiO_4$ or both.

According to the fifth embodiment of the present disclosure, there is provided the negative electrode material as defined in any one of the first to the fourth embodiments, wherein the first active material particle includes a plurality of silicon phases containing crystalline silicon, and the silicon phases are embedded/buried in the silicon oxide material and dispersed/distributed in dot-like shapes.

According to the sixth embodiment of the present disclosure, there is provided the negative electrode material as defined in any one of the first to the fifth embodiments, wherein the first active material particle has a plurality of pores inside of the body thereof and on the outer surface thereof, and the pores have a diameter of 2 nm to 1 μm based on the largest pore diameter.

According to the seventh embodiment of the present disclosure, there is provided the negative electrode material as defined in any one of the first to the sixth embodiments, wherein the first active material particles have a carbon coating layer covering at least a part of the surfaces thereof, and the coating layer includes carbon black, acetylene black or Ketjen black, or is formed by a vapor deposition process using a gaseous ingredient, such as methane gas.

According to the eighth embodiment of the present disclosure, there is provided the negative electrode material as defined in any one of the first to the seventh embodiments, wherein the first active material particles and the second active material particles are mixed at a weight ratio of 1:99-30:70 in the negative electrode material.

In another aspect of the present disclosure, there is also provided a negative electrode for an electrochemical device. According to the ninth embodiment of the present disclosure, there is provided a negative electrode including the negative electrode material as defined in any one of the first to the eighth embodiments.

In still another aspect of the present disclosure, there is also provided an electrode assembly including the negative electrode. According to the tenth embodiment of the present disclosure, there is provided an electrode assembly including a negative electrode, a positive electrode and a separator interposed between the negative electrode and the positive electrode, wherein the negative electrode is defined in the ninth embodiment.

Advantageous Effects

The negative electrode active material according to the present disclosure includes a composite of a carbonaceous material having a broad particle size distribution with a metal-silicate, and thus provides improved electrical conductivity and life characteristics.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, the shape, dimension, scale or proportion of an element in the accompanying drawings may be exaggerated for the purpose of clearer description.

FIG. 1 is a graph illustrating the cycle characteristics of the batteries according to Examples as compared to the batteries according to Comparative Examples.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

As used herein, the expression 'one portion is connected to another portion' covers not only 'a portion is directly connected to another portion' but also 'one portion is connected indirectly to another portion' by way of the other element interposed between them.

Throughout the specification, the expression 'a part [ includes] an element' does not preclude the presence of any additional elements but means that the part may further include the other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the term 'combination thereof' included in any Markush-type expression means a combination or mixture of one or more elements selected from the group of elements disclosed in the Markush-type expression, and refers to the presence of one or more elements selected from the group.

As used herein, the expression 'A and/or B' means 'A, B or both of them'.

The present disclosure relates to a negative electrode active material for an electrochemical device, a negative electrode including the same, and an electrochemical device including the negative electrode. Herein, the electrochemical device includes any device which carries out electrochemical reaction, and particular examples thereof include all types of primary batteries, secondary batteries, fuel cells, solar cells or capacitors. Particularly, among the secondary batteries, lithium secondary batteries, including lithium metal secondary batteries, lithium ion secondary batteries, lithium polymer secondary batteries or lithium ion polymer batteries, are preferred.

Hereinafter, the negative electrode active material according to the present disclosure will be explained in more detail.

Negative Electrode Material

The present disclosure relates to a negative electrode material that may be used as a negative electrode active material. The negative electrode material includes a silicon oxide material containing a metal (M)-silicate, and a carbonaceous material. According to an embodiment of the present disclosure, the negative electrode material may include a mixture of the silicon oxide material with the carbonaceous material at a predetermined ratio. According to another embodiment of the present disclosure, the negative electrode material means a mixture of a plurality of first active material particles containing the silicon oxide material with a plurality of second active material particles containing the carbonaceous material. In the negative electrode material, the first active material particles may be mixed with the second active material particles at a ratio of 1:99-30:70 (weight ratio). According to still another embodiment of the present disclosure, the first active material particles may be present at 10 parts by weight or lower based on total 100 parts by weight of the first and the second active material within the above-defined range.

According to the present disclosure, the silicon oxide material may include a metal (M)-silicate and silicon oxide, wherein the metal (M) is lithium (Li), magnesium (Mg), calcium (Ca) or at least two of them. According to an embodiment of the present disclosure, the metal (M) preferably includes magnesium (Mg). The silicon oxide material may be represented by M-SiO$_x$ (wherein 0<x≤2). According to an embodiment of the present disclosure, the silicon oxide material may include MgSiO$_3$, Mg$_2$SiO$_4$ or both.

According to an embodiment of the present disclosure, the first active material particles include a plurality of silicon phases including crystalline silicon. Particularly, the silicon phases may be embedded/buried in the silicon oxide material and dispersed/distributed in the silicon oxide material in dot-like shapes. For example, the silicon phases are present in a state mixed with the metal (M)-silicate and silicon oxide. More particularly, the silicon phases may be dispersed/distributed in a matrix including the metal (M)-silicate and silicon oxide in dot-like shapes. The silicon phase is a group formed by assemblage of one or more silicon crystals, and a single group may be present or two or more groups may be present.

According to an embodiment of the present disclosure, the first active material particles including the silicon oxide material may have a plurality of pores present inside of the body and on the outer surface thereof. The pores may be opened and/or closed and two or more open pores may be interconnected. In addition, ingredients, such as ion, gas and liquid, may pass through the particles through the interconnected pores. According to another embodiment of the present disclosure, the pores may have a diameter of 2 nm to 1 µm based on the largest pore diameter. Preferably, the pore diameter may be 500 nm or less, 200 nm or less, 100 nm or less, or 50 nm or less.

According to an embodiment of the present disclosure, the first active material particles including the silicon oxide material may be provided with a carbon coating layer covering at least a part of the surface of particles. The carbon coating layer may be bound to, attached to or coated on the surface of particles. The coating layer may include at least one selected from the group consisting of crystalline carbon, carbon black, acetylene black, Ketjen black, natural graphite, artificial graphite, kish graphite, graphitized carbon fibers, graphitized mesocarbon microbeads, graphene and amorphous carbon. In addition, the graphite may include those obtained by heat treatment or firing (graphitization) of at least one selected from the group consisting of soft carbon, hard carbon, pyrolytic carbon, mesophase pitch based carbon fibers, meso-carbon microbeads, mesophase pitches and petroleum or coal tar pitch derived cokes and activated carbon, at high temperature. In addition, according to an embodiment of the present disclosure, the carbon coating layer may be formed through a vapor deposition process, such as chemical vapor deposition (CVD), by using carbon-containing gas, such as methane gas. Meanwhile, it is to be understood that description of the carbon coating layer ingredients covering the first active material particles does not refer to the carbonaceous material contained in the second active material particles, but refers to the carbon coating layer as an ingredient of the first active material particles, separately from the carbonaceous material.

Meanwhile, according to an embodiment of the present disclosure, the coating layer may have a thickness of 10-150 nm. Within the above-defined range, the upper limit of the coating layer thickness may be 100 nm, 80 nm, 70 nm or 50 nm, and the lower limit thereof may be 15 nm, 25 nm, 35 nm or 50 nm.

According to the present disclosure, the first active material particles include a silicon oxide material (including metal (M)-silicate and silicon oxide), which is an ingredient inactive to Li and causes no Li intercalation/deintercalation during the charge of a battery. Although Si forms a composite with Li to contribute to charge/discharge of a battery, it has a problem of a severe change in volume during charge/discharge. To solve the problem, a negative electrode material using microcrystalline Si or a composite of Si with SiO$_2$ has been developed. However, SiO$_2$ forms LiO$_2$ or Li—S—O during the initial charge to generate irreversible capacity undesirably. Thus, the present disclosure has paid attention to reducing generation of such initial irreversible capacity by incorporating a metal element having binding force to oxygen equal to or higher than the binding force of Li to oxygen. As described above, the first active material particles include a silicon oxide material, and the silicon oxide material includes a metal (M)-silicate and silicon oxide (SiO$_x$ (0<x≤2)), wherein the metal (M) is at least one selected from Mg, Li and Ca, preferably Mg. In addition, the metal (M)-silicate includes magnesium silicate (Mg-silicate), wherein the Mg-silicate includes MgSiO$_3$, Mg$_2$SiO$_4$ or both of them. In the silicon oxide-based composite, the metal (M)-silicate and silicon oxide are present in such a state that the elements of each phase are diffused so that the boundary surface of one phase is bound to that of another phase (i.e., the phases are bound to each other in an atomic level), and thus undergo little change in volume during lithium ion intercalation/deintercalation and hardly cause cracking of silicon oxide-based composite particles even after repeating charge/discharge.

In addition, according to an embodiment of the present disclosure, the metal (M) may be present in an amount of 4-20 wt %, 4-16 wt %, or 4-10 wt % based on 100 wt % of the silicon oxide material. When the metal (M) content satisfies the above-defined range, it is possible to improve efficiency while minimizing a decrease in capacity.

According to an embodiment of the present disclosure, Si crystallite may have a size of 1-15 nm in the first active material particles. When the Si crystal size, i.e. Si crystallite size is larger than the above-defined range, life characteristics may be degraded. Meanwhile, it is preferred that SiO$_x$ is micronized so that the crystallinity may not be observed through X-ray diffractometry (XRD).

According to the present disclosure, the negative electrode material includes a carbonaceous material in combination with the silicon oxide material. In other words, the negative electrode material includes a mixed phase of the first particles containing the silicon oxide material with the second particles containing a carbonaceous material. The carbonaceous material may include at least one selected from the group consisting of crystalline carbon, carbon black, acetylene black, Ketjen black, natural graphite, artificial graphite, kish graphite, graphitized carbon fibers, graphitized mesocarbon microbeads, graphene and amorphous carbon. In addition, graphite may include those obtained by graphitization of at least one selected from the group consisting of soft carbon, hard carbon, pyrolytic carbon, mesophase pitch based carbon fibers, meso-carbon microbeads, mesophase pitches and petroleum or coal tar pitch derived cokes and activated carbon.

Meanwhile, according to an embodiment of the present disclosure, the carbonaceous material may be prepared in the form of secondary particles formed by aggregation of fine primary particles. At least one of the primary particles and the secondary particles may be coated with a carbon coating layer. The coating layer may include at least one selected from the group consisting of crystalline carbon, carbon black, acetylene black, Ketjen black, natural graphite, artificial graphite, kish graphite, graphitized carbon fibers, graphitized mesocarbon microbeads, graphene and amorphous carbon. In addition, graphite may include those obtained by graphitization of at least one selected from the group consisting of soft carbon, hard carbon, pyrolytic carbon, mesophase pitch based carbon fibers, meso-carbon microbeads, mesophase pitches and petroleum or coal tar pitch derived cokes and activated carbon. In addition, the carbonaceous material coated with the carbon coating layer may be obtained by mixing the primary particles of carbonaceous material with a carbon precursor, such as pitch binder, and forming secondary particles of the resultant mixture and carbonizing the carbon precursor. Otherwise, the carbon coating layer may be formed through a vapor deposition process, such as chemical vapor deposition (CVD), by using carbon-containing gas, such as methane gas. Meanwhile, according to an embodiment of the present disclosure, the coating layer may have a thickness of 10-150 nm.

According to an embodiment of the present disclosure, each of the silicon oxide material and carbonaceous material may be prepared in the form of a particle phase having a predetermined particle diameter range. Hereinafter, the first active material particles are referred to as particles A and the second active material particles are referred to as particles B. In addition, the particle diameter $D_{50}$ of particles A is referred to as 'r' and that of particles B is referred to as 'R'.

The particle diameter $D_{50}$ means the particle diameter at 50% in the volume accumulated particle size distribution. The volume accumulated particle size distribution is obtained assuming a single powder set. When the accumulation curve is plotted, while the total volume of the powder set is taken as 100% in the particle size distribution, the particle diameters at 10%, 50% and 90% of the accumulation curve is defined as 10% particle diameter, 50% particle diameter (diameter accumulated median diameter) and 90% particle diameter (μm), respectively.

In terms of particle size distribution, the negative electrode material according to the present disclosure satisfies the following Formula 1:

$$1 \ \mu m \leq r \leq 0.4R \quad \text{[Formula 1]}$$

When r is less than 1 μm, oxidization occurs during a pulverization step, resulting in degradation of capacity and efficiency. In addition, when r is larger than 0.4R, the electrode shows low electrical conductivity, resulting in degradation of life characteristics.

According to an embodiment of the present disclosure, particles B preferably satisfy that the full width at half maximum (FWHM) value is 9 μm or more in the particle size distribution. According to the present disclosure, the FWHM value may be determined by plotting the central value from experiment obtained by Gaussian fitting of particle size distribution of particles B and FWMH distribution. Herein, the full width at half maximum value shows the peak width at the position corresponding to a half of the peak top height in the particle size distribution determined as described above (abscissa: particle diameter (μm), ordinate: frequency (%)). The inventors of the present disclosure have found that when using a graphite material having a relatively broad particle size distribution with a full width at half maximum value of 9 μm or more, conductivity may be improved as compared to a graphite material having a smaller particle size distribution.

According to an embodiment of the present disclosure, r may be 1-6 μm, and R may be 15-24 μm.

Preparation of Negative Electrode Active Material

1) Particles A Including Silicon Oxide Material

According to an embodiment of the present disclosure, particles A including the silicon oxide material may be prepared by mixing a metal (M) with a silicon oxide ($SiO_x$, 0<x<2) in a gaseous state by using a process, such as chemical vapor deposition (CVD) or atomic layer deposition (ALD), depositing the mixture on the surface of a substrate, and carrying out pulverization. In addition, as described above, particles A may be further provided with a carbon coating layer on the surface thereof.

This will be explained in more detail hereinafter.

The above-mentioned method includes the steps of: carrying out reaction of SiOx (0<x<2) gas with metal (M) gas and cooling the reaction mixture to deposit a silicon oxide composite; and pulverizing the deposited silicon oxide composite to obtain particles A.

In addition to this, the method may further include a step of injecting a gas of carbonaceous material and carrying out heat treatment to form a carbon coating layer including a carbonaceous material on the surface of particles A.

Herein, the cooling step may be carried out at 400-900° C. In addition, the heat treatment step may be carried out at 850-1,150° C. for 30 minutes to 8 hours. According to an embodiment of the present disclosure, the $SiO_x$ (0<x<2) gas may be prepared by allowing Si and/or $SiO_2$ to evaporate at 1,000-1,800° C., and the metal (M) gas may be prepared by allowing a metal (M) to evaporate at 800-1,600° C.

The reaction of $SiO_x$ (0<x<2) gas with metal (M) gas may be carried out at 800-1800° C. Then, quenching may be carried out to a target cooling temperature of 400-900° C., particularly 500-800° C., within 1-6 hours. When the quenching time satisfies the above-defined range after the vapor phase reaction of $SiO_x$ (0<x<2) gas with metal (M) gas, such quenching to a low temperature within a short time can solve the problem of insufficient reaction of gaseous metal (M) with SiOx which results in a failure in formation of silicate and a residual undesired phase, such as MgO. Thus, it is possible to significantly improve the initial efficiency and an effect of preventing swelling, thereby providing significantly improved life of a battery. After cooling, heat treatment may be further carried out, wherein the size of Si crystallites and Mg-silicate proportion may be controlled depending on heat treatment temperature. For example, when the additional heat treatment is carried out at high temperature, $Mg_2SiO_4$ phase may be increased and the Si crystallite size may be increased.

According to an embodiment of the present disclosure, a vapor deposition reactor may be used to prepare particles A including the silicon oxide material. For example, such a vapor deposition reactor may include a fill port, gas suction port and a discharge port connected to a deposition chamber. As carrier gas, hydrogen, helium, nitrogen, argon or a combination thereof may be used. While the carrier gas is introduced to the vapor deposition reactor through the gas suction port, a precursor compound forming the core portion may also be introduced into the reactor together with the carrier gas. Then, while the precursor compound is adsorbed chemically onto the substrate surface in the reactor, the silicon oxide material may be deposited in a bulk state.

According to an embodiment of the present disclosure, the deposited silicon oxide composite may include a crystalline silicon phase and a matrix in which the silicon phases are scattered, wherein the matrix includes Mg-silicate and silicon oxide. In addition, it is possible to form the silicon phase and matrix into a size corresponding to microcrystals of about 100 nm by selecting a composition similar to the composition at the eutectic point.

Next, the deposited silicon oxide composite is pulverized to a particle diameter ($D_{50}$) of 0.1-20 μm through a mechanical milling process, or the like. Then, a carbonaceous material gas, such as methane gas, is injected and heat treatment is carried out in a rotary tubular furnace to form a carbon coating layer on the surface of the silicon oxide composite as a core portion. The carbon coating layer may include a carbonaceous ingredient resulting from the heat treatment of the carbonaceous material gas, such as methane. Particularly, the carbon coating layer may be formed as follows. The resultant composite powder is introduced to a rotary tubular furnace, argon gas is allowed to flow, and the temperature is increased to 850-1,150° C. at a rate of about 5° C./min. While the rotary tubular furnace is rotated and argon gas and the carbonaceous material gas are allowed to flow therethrough, heat treatment is carried out for 30 minutes to 8 hours to form a carbon coating layer.

According to an embodiment of the present disclosure, a vapor deposition reactor may be used to prepare particles A including the silicon oxide material. For example, such a vapor deposition reactor may include a fill port, gas suction port and a discharge port connected to a deposition chamber. As carrier gas, hydrogen, helium, nitrogen, argon or a combination thereof may be used. While the carrier gas is introduced to the vapor deposition reactor through the gas suction port, a precursor compound forming particles A including a silicon oxide material may also be introduced into the reactor together with the carrier gas. Then, while the precursor compound is adsorbed chemically onto the substrate surface in the reactor, the silicon oxide material is deposited in a bulk state. According to an embodiment of a method for preparing particles A of the present disclosure, SiO and Mg are introduced to the reactor in a gaseous state through high-temperature evaporation and then they are mixed. The resultant gaseous mixture is deposited on a substrate at a temperature lower than the internal temperature in a bulk state. Then, the product deposited on the substrate is pulverized to prepare powder.

Meanwhile, the method for forming a carbon coating layer is not limited to the above-described method. Any method may be selected by those skilled in the art, as long as it can realize the above-mentioned characteristics of the carbon coating layer.

2) Particles B Including Carbonaceous Material

When artificial graphite is used as carbonaceous material, coke is pulverized and mixed with a pitch binder, the resultant mixture is formed into secondary particles, and the secondary particles are graphitized through high-temperature heat treatment (3,000° C.) to obtained secondary particles of artificial graphite. Meanwhile, if necessary, pitch may be used to perform coating with a carbonaceous material additionally at 1,100° C. Optionally, a graphitization step is carried out first, and then mixing with a pitch binder/carbonization steps may be carried out to prepare secondary particles of artificial graphite. Meanwhile, when natural graphite is used as a carbonaceous material, scaly graphite is spheroidized and then surface coating with pitch may be carried out.

Negative Electrode

The negative electrode according to the present disclosure may be obtained by applying and drying a mixture of a negative electrode active material, a conductive material and a binder on a negative electrode current collector. If desired, the mixture may further include a filler. The negative electrode active material includes the above-described negative electrode material.

According to the present disclosure, the current collector is formed to have a thickness of 3-500 μm. The current collector is not particularly limited, as long as it causes no chemical change in the corresponding battery and has high conductivity. Particular examples of the current collector may include stainless steel; aluminum; nickel; titanium; baked carbon; aluminum or stainless steel surface-treated with carbon, nickel, titanium or silver; aluminum-cadmium alloy; or the like. A suitable current collector may be selected depending on the polarity of a positive electrode or negative electrode.

The binder is an ingredient which assists binding between the electrode active material and the conductive material and binding to the current collector. In general, the binder is added in an amount of 1-50 wt % based on the total weight of the electrode mixture. High-molecular weight polyacrylonitrile-co-acrylic acid may be used as a binder but the scope of the present disclosure is not limited thereto. Other examples of the binder include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butyrene rubber, fluororubber, various copolymers, or the like.

The conductive material is an ingredient causing no chemical change in the corresponding battery. Particular examples of the conductive material include: graphite, such as natural graphite or artificial graphite; carbon black, such as carbon black, acetylene black, Ketjen black, carbon nanotubes, carbon nanofibers, channel black, furnace black, lamp black or thermal black; conductive fibers, such as carbon fibers or metallic fibers; metal powder, such as fluorocarbon, aluminum or nickel powder; conductive whisker, such as zinc oxide or potassium titanate; conductive metal oxide, such as titanium oxide; and conductive materials, such as polyphenylene derivatives.

Lithium Secondary Battery

In another aspect, there is provided a lithium secondary battery including a positive electrode, the negative electrode according to the present disclosure and a separator interposed between the negative electrode and the positive electrode.

The positive electrode may be obtained by applying and drying a mixture of a positive electrode active material, a conductive material and a binder on a positive electrode current collector. If desired, the mixture may further include a filler. Particular examples of the positive electrode active material include, but are not limited to: layered compounds such as lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); $LiMn_2O_4$ in which Li is partially substituted with an alkaline earth metal ion; disulfide compounds; $Fe_2(MoO_4)_3$; or the like.

The conductive material, current collector and the binder used for the positive electrode may refer to those described hereinabove with reference to the negative electrode.

The separator is interposed between the positive electrode and the negative electrode, and may be an insulating thin film having high ion permeability and mechanical strength. In general, the separator may have a pore diameter and thickness of 0.01-10 μm and 5-300 μm, respectively. Particular examples of the separator include: olefinic polymers, such as polypropylene having chemical resistance and hydrophobicity; sheets or non-woven webs made of glass fibers or polyethylene; or the like. Meanwhile, the separator may further include a porous layer containing a mixture of inorganic particles with a binder resin, on the outermost surface thereof.

According to the present disclosure, the electrolyte includes an organic solvent and a predetermined amount of lithium salt. Particular examples of the organic solvent include propylene carbonate (PC), ethylene carbonate (EC), butylene carbonate (BC), diethyl carbonate (DEC), dimethyl carbonate (DMC), dipropyl carbonate (DPC), methyl propionate (MP), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (GBL), flouroethylene carbonate (FEC), methyl formate, ethyl formate, propyl formate, methyl acetate, ethyl acetate, propyl acetate, pentyl acetate, methyl propionate, ethyl propionate, butyl propionate, or a combination thereof. In addition, halogen derivatives of the organic solvents and linear ester compounds may also be used. The lithium salt is an ingredient easily soluble in the non-aqueous electrolyte, and particular examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, lithium chloroborate, lower aliphatic lithium carboxylate, lithium tetraphenylborate, imides, or the like.

The secondary battery according to the present disclosure may be obtained by receiving and sealing an electrode assembly including positive electrodes and negative electrodes stacked alternatively with separators interposed therebetween in a casing material, such as a battery casing, together with an electrolyte. Any conventional methods for manufacturing a secondary battery may be used with no particular limitation.

In still another aspect, there are provided a battery module including the secondary battery as a unit cell, and a battery pack including the battery module. Since the battery module and battery pack include a secondary battery which shows excellent quick charging characteristics at a high loading amount, they may be used as power sources for electric vehicles, hybrid electric vehicles, plug-in hybrid electric vehicles and power storage systems.

Meanwhile, reference will be made to description about elements used conventionally in the field of a battery, particularly a lithium secondary battery, about other battery elements not described herein, such as a conductive material.

Hereinafter, the present disclosure will be explained in detail with reference to Examples. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

EXAMPLES (1) Preparation of Negative Electrode Material

Example 1

Preparation of Particles A: Powdery Si and $SiO_2$ were mixed at a ratio (molar ratio) of 1:1 and heat treated under reduced pressure of 1 torr to allow the mixture in a gaseous state of $SiO_x$ (0<x<2). Mg was also allowed to evaporate in a vapor state through heat treatment so that it might react with SiOx (0<x<2) at 1300° C. for 3 hours. Then, the reaction product was cooled on a plate at 800° C. within 4 hours so that it might be deposited on the substrate. The evaporation temperature of $Si/SiO_2$ was 1,400° C. and that of Mg was 900° C. The deposited product was analyzed by X-ray diffractometry (XRD). It was shown that the deposited product included Mg-containing silicon oxide (Mg-silicate). The bulk-state deposited product was pulverized by using a jet mill to a diameter ($D_{50}$) of about 5 μm. Then, a carbon coating layer was formed on the powder of pulverized product by using a chemical vapor deposition (CVD) process. The CVD process was carried out by injecting methane gas at 950° C. under argon (Ar) atmosphere. The processing time was 2 hours. After analyzing the resultant composite particle powder, the powder included Mg in an amount of about 6% based on 100 wt % of its total weight, wherein the carbon content in the shell portion was about 5%. The Mg amount was determined by inductive coupled plasma (ICP) analysis and the carbon content was determined by carbon/sulfur (C/S) analysis.

Preparation of Particles B: Petroleum coke was pulverized to a diameter ($D_{50}$) of about 7 μm, and then graphitized at 3,000° C. Then, the resultant product was mixed with a pitch binder, formed into secondary particles and carbonized at 1,100° C. under nitrogen ($N_2$) atmosphere to obtain secondary particles of artificial graphite having a diameter ($D_{50}$) of 16.1 μm.

Then, particles A and particles B were mixed simply with each other at the weight ratio as shown in the following Table 1 and the resultant mixture was used as a negative electrode active material.

Example 2

Preparation of Particles A: Particles A were obtained in the same manner as Example 1.

Preparation of Particles B: Petroleum needle coke was pulverized to a diameter ($D_{50}$) of 9 μm and mixed with a pitch binder, and then the resultant mixture was formed into secondary particles and graphitized at 3,000° C. Then, the resultant product was mixed with pitch and carbonized at 1,100° C. to obtain secondary particles of artificial graphite having a diameter ($D_{50}$) of 22.4 μm.

Example 3

Preparation of Particles A: Particles A were obtained in the same manner as Example 1, except that pulverization was carried out to a diameter ($D_{50}$) of 3.2 μm.

Preparation of Particles B: Particles B were obtained in the same manner as Example 1.

Comparative Example 1

Preparation of Particles A: Particles A were obtained in the same manner as Example 1, except that pulverization was carried out to a diameter ($D_{50}$) of 8.0 µm.

Preparation of Particles B: Particles B were obtained in the same manner as Example 1.

Comparative Example 2

Preparation of Particles A: Particles A were obtained in the same manner as Example 1.

Preparation of Particles B: Particles B were obtained by using the same coke as Example 1 except that the primary particles were pulverized finely to a diameter ($D_{50}$) of 4.5 µm and the finished product of secondary particles had a particle size of 11.8 µm.

Comparative Example 3

Preparation of Particles A: Particles A were obtained in the same manner as Example 1.

Preparation of Particles B: Particles B were obtained in the same manner as Example 1. Then, a part of micropowder was removed through an air flow classification process and a part of macropowder having a large size was removed through a sieve.

Comparative Example 4

Preparation of Particles A: Particles A were obtained in the same manner as Example 3.

Preparation of Particles B: Spheroidized natural graphite was used. Scaly natural graphite was used as a raw material and subjected to a spheroidization process. Then, the resultant product was coated with pitch, carbonized at 1,100° C. and pulverized to a diameter ($D_{50}$) of 16.5 µm.

The negative electrode material used for each of Examples and Comparative Examples is shown in Table 1.

TABLE 1

| | Particles A $D_{50}$ (µm) | Particles B $D_{50}$ (µm) | FWHM (µm) | Particles A:B content (weight ratio) | 0.4R |
|---|---|---|---|---|---|
| Ex. 1 | 5.0 | 16.1 | 11.3 | 5:95 | 6.44 |
| Ex. 2 | 5.0 | 22.4 | 13.7 | 5:95 | 8.96 |
| Ex. 3 | 3.2 | 16.1 | 11.3 | 5:95 | 6.44 |
| Comp. Ex. 1 | 8.0 | 16.1 | 11.3 | 5:95 | 6.44 |
| Comp. Ex. 2 | 5.0 | 11.8 | 8.3 | 5:95 | 4.72 |
| Comp. Ex. 3 | 5.0 | 16.5 | 7.3 | 5:95 | 6.6 |
| Comp. Ex. 4 | 3.2 | 16.5 | 7.5 | 5:95 | 6.6 |

(2) Determination of Sheet Resistance

Each of the negative electrode active materials according to Examples and Comparative Examples, carboxymethyl cellulose (CMC) and styrene-butadiene rubber (SBR) were mixed with water at a weight ratio of 95:2:3 to obtain negative electrode slurry. The slurry was coated homogeneously on copper foil having a thickness of 20 µhe coating was carried out at an electrode drying temperature of 80° C. and a coating rate of 0.2 m/min. The resultant electrode was pressed to a porosity of 28% by using a roll press device to satisfy a target thickness. Then, the electrode was dried in a vacuum oven at 130° C. for 8 hours. The electrode had an electrode density of 1.6 g/cc. As a counter electrode, lithium metal foil was used. A separator (porous film made of polypropylene film, 30 µm, Celgard Co.) was interposed between both electrodes to form an electrode assembly, and an electrolyte was injected thereto to obtain a coin-type half secondary battery. The electrolyte was prepared by mixing ethylene carbonate with ethyl methyl carbonate at a weight ratio of 3:7.

Each battery was subjected to initial charge/discharge at 0.1 C and then disassembled. Each negative electrode was washed with dimethyl carbonate (DMC) and dried. Then, sheet resistance was determined. The results are shown in the following Table 2. As used herein, 'sheet resistance' means the specific resistance of foil per unit thickness. In this test, the sheet resistance of an active material layer was measured five times by using an MP tester (electrode/interfacial contact resistance analyzer available from Multi-Hioki Co.) and the measured values were averaged. The results are shown in the following Table 2.

TABLE 2

| | Electrical conductivity of electrode (ohm/cm²) (Electrode disassembled after the first charge/discharge) |
|---|---|
| Ex. 1 | 0.0508 |
| Ex. 2 | 0.0488 |
| Ex. 3 | 0.0497 |
| Comp. Ex. 1 | 0.0557 |
| Comp. Ex. 2 | 0.0540 |
| Comp. Ex. 3 | 0.0525 |
| Comp. Ex. 4 | 0.0528 |

(3) Evaluation of Charge/Discharge Characteristics

Each of the negative electrode active materials according to Examples and Comparative Examples, carboxymethyl cellulose (CMC) and styrene-butadiene rubber (SBR) were mixed with water at a weight ratio of 95:2:3 to obtain negative electrode slurry. The slurry was coated homogeneously on copper foil having a thickness of 20 µm. The coating was carried out at an electrode drying temperature of 80° C. and a coating rate of 0.2 m/min. The resultant electrode was pressed to a porosity of 28% by using a roll press device to satisfy a target thickness. Then, the electrode was dried in a vacuum oven at 130° C. for 8 hours. The electrode had an electrode density of 1.6 g/cc.

A positive electrode active material ($LiNi_{0.6}Mn_{0.2}Co_{0.2}O_2$), a conductive material (Super C) and polyvinylidene fluoride (PVdF) were mixed with acetone at a weight ratio of 95:2:3 to obtain positive electrode slurry. The slurry was coated homogeneously on aluminum foil having a thickness of 20 µm. The coating was carried out at an electrode drying temperature of 80° C. and a coating rate of 0.2 m/min. The resultant electrode was pressed to a porosity of 28% by using a roll press device to satisfy a target thickness. Then, the electrode was dried in a vacuum oven at 130° C.

A separator (porous film made of polypropylene film, 30 µm, Celgard Co.) was interposed between both electrodes to form an electrode assembly, and an electrolyte was injected thereto to obtain a coin-type half secondary battery. The electrolyte was prepared by mixing ethylene carbonate with ethyl methyl carbonate at a weight ratio of 3:7.

Each of the batteries according to Examples and Comparative Examples was determined for cycle characteristics. The first 3 cycles were carried out in a 0.2 C constant current (CC) mode. Then, 4-100 cycles of charge/discharge were carried out at 0.33 C in a CC mode. The charge/discharge test was carried out at 25° C. In the test, capacity maintenance was calculated according to the following Formula 2. The results are shown in FIG. 1.

Capacity maintenance (%)=[Discharge capacity at the $100^{th}$ cycle/Discharge capacity at the $2^{nd}$ cycle]×100            [Formula 2]

What is claimed is:

1. A negative electrode material comprising first active material particles and second active material particles,
   wherein the first active material particles comprise a silicon oxide material comprising a metal (M)-silicate and silicon oxide;
   the second active material particles comprise a carbonaceous material;
   the negative electrode material satisfies the following Formula 1, when a particle diameter $D_{50}$ of the first active material particles is represented by r and a particle diameter $D_{50}$ of the second active material particles is represented by R; and
   the second active material particles have a particle size distribution with a full width at half maximum (FWHM) value of 11.3 μm or more, as determined from Gaussian fitting of the particle size distribution of the second active material particles:

$$1 \ \mu m \leq r \leq 0.4R. \quad \text{[Formula 1]}$$

2. The negative electrode material according to claim 1, wherein the metal (M) comprises one selected from the group consisting of lithium (Li), magnesium (Mg), calcium (Ca) and combination thereof.

3. The negative electrode material according to claim 2, wherein the metal (M) comprises magnesium (Mg).

4. The negative electrode material according to claim 1, wherein the metal (M)-silicate comprises Mg-silicate, and the Mg-silicate comprises $MgSiO_3$, $Mg_2SiO_4$ or both.

5. The negative electrode material according to claim 1, wherein each of the first active material particles comprises a plurality of silicon phases including crystalline silicon, and the silicon phases are embedded or buried in the silicone oxide material and dispersed or distributed in dots.

6. The negative electrode material according to claim 1, wherein each of the first active material particles has a plurality of pores inside and on an outer surface of the first active material particles, and a largest pore diameter of the pores is 2 nm to 1 μm.

7. The negative electrode material according to claim 1, wherein the first active material particles have a carbon coating layer covering at least a portion of outer surfaces thereof, and the carbon coating layer comprises at least one selected from the group consisting of carbon black, acetylene black and Ketj en black.

8. The negative electrode material according to claim 1, wherein the first active material particles and the second active material particles are mixed at a weight ratio of 1:99-30:70 in the negative electrode material.

9. The negative electrode material according to claim 8, wherein the silicon oxide material is present at 10 parts by weight or lower based on 100 parts by weight of the first and the second active material particles.

10. A negative electrode comprising the negative electrode material according to claim 1.

11. An electrode assembly comprising the negative electrode according to claim 10, a positive electrode and a separator interposed between the negative electrode and the positive electrode.

12. The negative electrode material according to claim 1, wherein the carbonaceous material comprises at least one selected from the group consisting of crystalline carbon, carbon black, acetylene black, Ketj en black, natural graphite, artificial graphite, kish graphite, graphitized carbon fibers, graphitized mesocarbon microbeads, graphene and amorphous carbon.

13. The negative electrode material according to claim 6, wherein the largest pore diameter of the pores is 500 nm or less.

14. The negative electrode material according to claim 7, wherein a thickness of the coating layer is 10-150 nm.

15. The negative electrode material according to claim 1, wherein the metal (M) is present in an amount of 4-20 wt % based on 100 wt % of the silicon oxide material.

16. The negative electrode material according to claim 1, wherein the metal (M) is present in an amount of 4-16 wt % based on 100 wt % of the silicon oxide material.

17. The negative electrode material according to claim 1, wherein the metal (M) is present in an amount of 4-10 wt % based on 100 wt % of the silicon oxide material.

18. The negative electrode material according to claim 1, wherein r is 1-6 μm.

19. The negative electrode material according to claim 1, wherein R is 15-24 μm.

* * * * *